US008788591B2

(12) United States Patent  
Jiang et al.

(10) Patent No.: US 8,788,591 B2
(45) Date of Patent: Jul. 22, 2014

(54) ASYNCHRONOUS MECHANISM AND MESSAGE POOL (76) Inventors: Jianguo Jiang, Sunnyvale, CA (US); Yaping Liu, Sunnyvale, CA (US); Jingwei Liang, Castro Valley, CA (US); Wei Huang, Fremont, CA (US); Shijun Wu, Beijing (CN)

(*) Notice: Subject to any disclaimer, the term of this patent is extended or adjusted under 35 U.S.C. 154(b) by 1461 days.

(21) Appl. No.: 10/794,411

(22) Filed: Mar. 4, 2004
(Under 37 CFR 1.47)

(65) Prior Publication Data
US 2005/0044151 A1    Feb. 24, 2005

Related U.S. Application Data (60) Provisional application No. 60/451,953, filed on Mar. 5, 2003.

(51) Int. Cl.
*G06F 15/16*    (2006.01)
(52) U.S. Cl.
USPC ......................................................... 709/206
(58) Field of Classification Search
USPC ......................................................... 709/206
See application file for complete search history.

(56) References Cited

U.S. PATENT DOCUMENTS

| | | | | |
|---|---|---|---|---|
| 5,005,014 A * | 4/1991 | Jasinski | 340/7.25 |
| 5,062,055 A * | 10/1991 | Chinnaswamy et al. | 702/182 |
| 5,581,804 A * | 12/1996 | Cameron et al. | 455/456.1 |
| 5,590,403 A * | 12/1996 | Cameron et al. | 455/503 |
| 5,596,330 A * | 1/1997 | Yokev et al. | 342/387 |
| 5,634,127 A * | 5/1997 | Cloud et al. | 719/313 |
| 5,634,198 A * | 5/1997 | Cameron et al. | 455/63.1 |
| 5,673,252 A * | 9/1997 | Johnson et al. | 370/449 |
| 5,710,885 A * | 1/1998 | Bondi | 709/224 |
| 5,828,835 A * | 10/1998 | Isfeld et al. | 709/200 |
| 5,875,329 A * | 2/1999 | Shan | 719/314 |
| 6,058,389 A | 5/2000 | Chandra et al. | |
| 6,085,277 A * | 7/2000 | Nordstrom et al. | 710/263 |
| 6,298,386 B1 * | 10/2001 | Vahalia et al. | 709/234 |
| 6,353,834 B1 | 3/2002 | Wong et al. | |
| 6,643,797 B1 * | 11/2003 | Horowitz | 714/20 |
| 6,754,621 B1 * | 6/2004 | Cunningham et al. | 704/219 |
| 6,817,018 B1 * | 11/2004 | Clarke et al. | 719/313 |
| 6,996,060 B1 * | 2/2006 | Dahlby et al. | 370/230 |
| 7,082,538 B2 * | 7/2006 | Bouchard et al. | 713/181 |
| 7,110,525 B1 * | 9/2006 | Heller et al. | 379/265.11 |
| 7,249,229 B2 * | 7/2007 | Ogasawara et al. | 711/154 |
| 7,379,421 B1 * | 5/2008 | Gao et al. | 370/230.1 |
| 7,676,034 B1 * | 3/2010 | Wu et al. | 379/265.01 |
| 7,783,787 B1 * | 8/2010 | DeBergalis et al. | 710/1 |
| 7,916,858 B1 * | 3/2011 | Heller et al. | 379/265.12 |
| 8,001,017 B1 * | 8/2011 | Franco | 705/28 |
| 8,219,606 B2 * | 7/2012 | Morris | 709/201 |

(Continued)

FOREIGN PATENT DOCUMENTS

WO    WO 95/10805 A1    4/1995
WO    WO9510805 A1 *    4/1995    ............... G06F 9/46

*Primary Examiner* — Azizul Choudhury
*Assistant Examiner* — Tariq Najee-Ullah
(74) *Attorney, Agent, or Firm* — Knobbe Martens Olson & Bear, LLP (57) ABSTRACT

Messages are received and retained in memory and are batch processed including transferring the messages to a cell pool having cells of predetermined size. The location and size of the messages are recorded in a table map with other pertinent information as is required. Messages in the cell pool are processed and delivered asynchronously.

39 Claims, 3 Drawing Sheets

(56) References Cited

U.S. PATENT DOCUMENTS

| | | | |
|---|---|---|---|
| 2002/0091928 A1* | 7/2002 | Bouchard et al. | 713/178 |
| 2002/0120705 A1 | 8/2002 | Schiavone et al. | |
| 2002/0129108 A1* | 9/2002 | Sykes, Jr. | 709/206 |
| 2002/0178283 A1* | 11/2002 | Robinson | 709/236 |
| 2004/0068479 A1* | 4/2004 | Wolfson et al. | 707/1 |
| 2004/0220918 A1* | 11/2004 | Scriffignano et al. | 707/3 |
| 2004/0221036 A1* | 11/2004 | Smith | 709/225 |
| 2005/0021770 A1* | 1/2005 | Helm et al. | 709/228 |
| 2005/0050139 A1* | 3/2005 | Creamer et al. | 709/200 |
| 2005/0155075 A1* | 7/2005 | Crichton | 725/105 |
| 2005/0182843 A1* | 8/2005 | Reistad et al. | 709/230 |
| 2005/0203673 A1* | 9/2005 | El-Hajj et al. | 701/1 |
| 2005/0223163 A1* | 10/2005 | Ogasawara et al. | 711/112 |
| 2005/0251450 A1* | 11/2005 | Koether et al. | 705/15 |
| 2006/0168240 A1* | 7/2006 | Olshefski | 709/227 |
| 2008/0228886 A1* | 9/2008 | Reed et al. | 709/206 |
| 2009/0292957 A1* | 11/2009 | Bower et al. | 714/55 |

\* cited by examiner

ASYNCHRONOUS MECHANISM AND MESSAGE POOL

CROSS-REFERENCE TO RELATED APPLICATIONS

This application claims the benefit of U.S. Provisional Application No. 60/451,953, filed on Mar. 5, 2003, which is incorporated by reference herein.

BACKGROUND

The invention relates generally to communication systems. The handling, transmission and storage of wireless and wired messages, using a protocol such as TCP/IP, can be problematic due to slowness in the handling of incoming traffic and delivery of outbound traffic. Incoming handling can be slowed by slow file creation, fragmentation and overhead delays arising from the storage of individual messages as files in a storage system. Outbound message delivery speed can be limited by the slow and unpredictable nature of looking up domain name servers, slow or delayed remote server response, remote systems being busy or down, and finite computer resources, such as size of the memory.

Systems for handling messages are described in U.S. Pat. Nos. 6,058,389 and 6,353,834, which provide an extensive background for the field and definitions of various components used to process data.

For wireless handheld and computer devices, particularly as related to the Internet, there needs to be a more efficient method of receiving and delivering messages.

SUMMARY

A system and method for handling incoming and outgoing messages is provided that includes a message processing system operable to write messages in batches to a message cell pool structure. A data processor receives messages that are retained in a memory. The data processor is operable to process the messages from the memory and write the messages in batches to individual cells of a message cell pool structure. The cells receive and retain the messages. The message cell pool structure is provided on a storage system with the cell pool having a number of cells of predetermined size. The message cell pool structure can be of the form of a first-in first-out (FIFO) queue where messages are written in an order that generally corresponds to receipt. A table map keeps track of the message location and status or other message information within the cells. Messages are written in batches, so as to eliminate the need to write each individual message as a file to the storage system. Further, because of the queue structure of the message cell pool, fragmentation of the writing of the batches to the storage system can be eliminated.

A delivery processor is provided to oversee the delivery processing of the stored messages. The delivery processor can read messages from the message cell pool structure and attempt delivery. Associated with the delivery processor can be one or more output queues. The output queues can be used to receive messages from the message cell pool structure (e.g., at a time when messages from the message cell pool structure are ready for delivery) for further processing by the delivery processor. The output queues can be serviced in accordance with a predefined ordering or policy (e.g., implementing quality of service differentiation for different classes of messages). Alternatively, output queues can be used only for storage of messages that are delayed, or otherwise difficult to deliver.

Aspects of the invention may include none, one or more of the following advantages. The messages need not remain in the memory longer than a given messaging protocol requires for server acknowledgement. The system allows for batching of messages that have been received. A message can be written to one or more cells. The cells can be optimized to accommodate the size of the message, for example, the cells can be sized to store at least 80% of the average sized message. Portions of a message can be written to cells prior to completely receiving a given message. Completely received messages can be written to the cells prior to completely receiving other messages. Thus, if only a portion of a first message in time is received before the entirety of a second message in time is received, the system need not wait to receive the entirety of the first message before processing the second message (i.e., writing the second message as part of a batch to the message cell pool structure). When the system receives a long message, the system may not need to wait to receive the entire message before processing a shorter message that is received in full. The system can have a plurality of interfaces and can contemporaneously receive a plurality of messages that are processed for subsequent transmission.

Cells can be written after either a predetermined time or after a predefined number of messages have been received. Messages can be written to and retrieved from the message cell pool structure in a first-in-first-out sequence. Writing to cells can minimize disk fragmentation.

A number of connections can be made for each delivery attempt. Multiple threads can be used to process the messages. During the course of delivering messages, the system can switch between awaiting connections, skipping over delayed transmissions. For delayed messages, the system only takes action on an awaiting connection when the receiver notifies the system that it is ready for further processing of the message. Messages with delivery failure can be returned and identified as returned by marking the message. Failed messages can be kept in separate storage for later processing. Storing a message in separate storage for later processing can reduce the bottleneck of message transmittal caused by returned messages. The methods used by the system can be applied to persistent store and forward systems that handle files rather than messages.

The proposed message processing system solves the problems associated with large volumes of incoming messages resulting in storage management bottlenecks and slow delivery due to limited system resources and unpredictability in the real world messaging environment. The proposed message processing system avoids the problem of slow handling of returned messages. The use of a message pool and batch writing increases storage management speed. Asynchronous delivery ensures the incoming messages are delivered without choking of the outgoing message system. Backup storage provides for efficient processing of returned messages to reduce the system burden.

DETAILED DESCRIPTION

Figure 1:
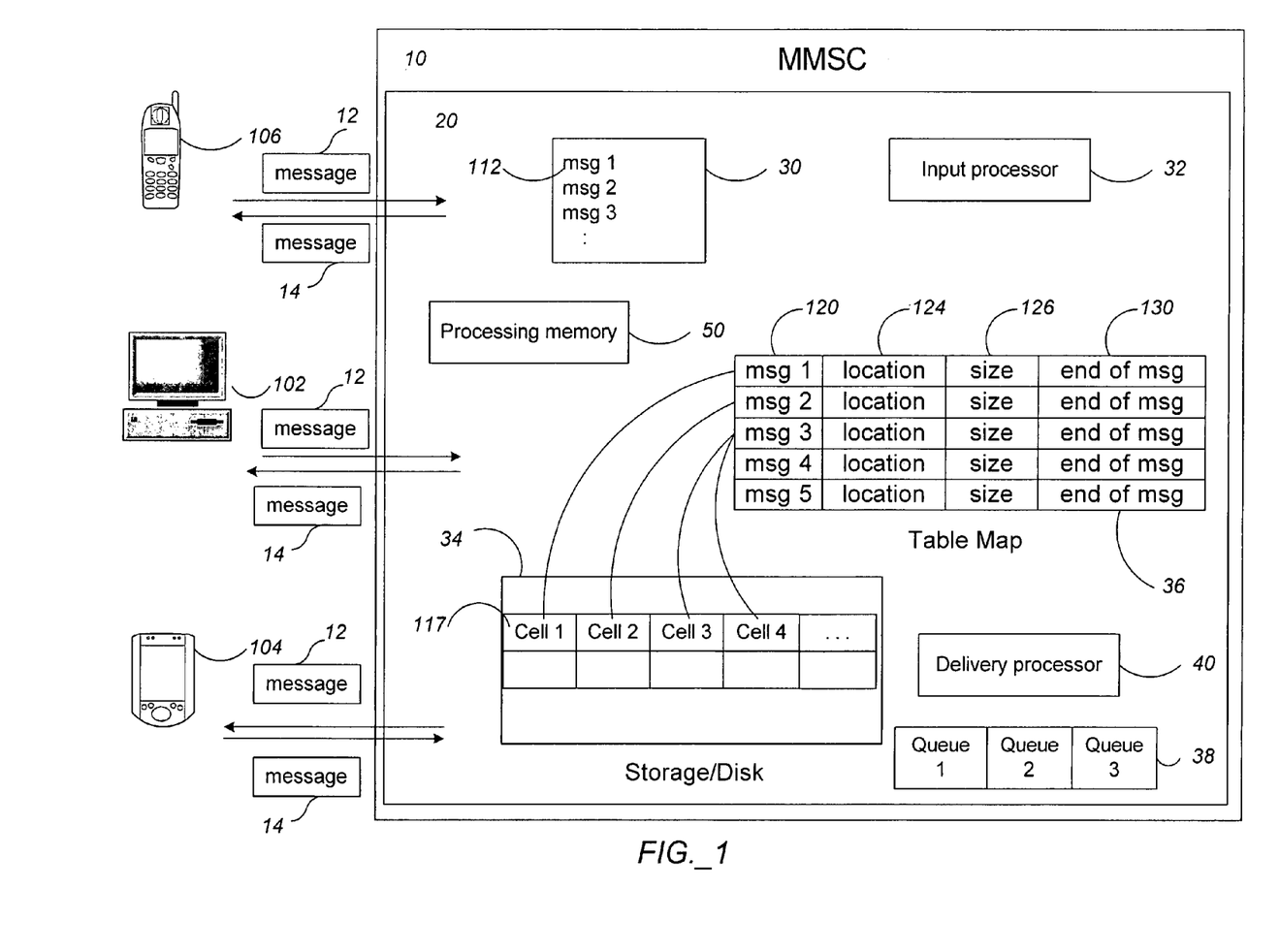
FIG. 1 is a block diagram of message processing system for receipt and storage of messages.

As shown in FIG. 1, a message processing system 10 is provided for processing messages received from one or more wired or wireless devices. In one implementation, message processing system 10 is embodied in a multimedia messaging service center (MMSC) employing a data processing unit 20. The message processing system 10 handles incoming 12 and outbound 14 messages. Message processing system 10 receives messages from wired and wireless devices 102, 104, 106, such as the Internet, PCs, PDAs, cell phones, etc. Data processing unit 20 includes a storage memory 30 for receiving messages 12; an input processor 32 for processing the messages 12; a message cell pool 34 with a plurality of cells 117 of predetermined size; and a table map 36 for identifying messages.

Optionally, message processing system 10 can have a separate delivery processor 40 and an output queue structure including one or more output queues 38 for delivery of messages. One or more of output queues 38 can be used to store messages that have failed to be transmitted to a remote receiver after a predetermined time lag, or that are returned from the remote system for various reasons, such as lack of storage and invalid recipient identity. The messages that have failed to be transmitted and that are returned messages can be processed independently of the messages that have not been returned or failed to be transmitted. Output queues 38 are discussed in greater detail below.

The message processing system 10 receives messages 12 from the clients, such as the computer 102 and the wireless client, e.g. palm pilot 104 or mobile phone 106. The messages 12 are received at storage memory 30 in a successive order as indicated by msg1, msg2, msg3, etc. 112 and retained in the storage memory 30 during a protocol lag. The protocol lag defines the time period in which an acknowledgment signal must be returned to a message sender in accordance with the messaging protocol being used. Absent the acknowledgement signal, the message sender may attempt retransmission of the message or otherwise indicate message failure. Messages can include meta-data, such as the address of the sender and the address of the intended recipient(s). In one implementation, storage memory 30 is a random access memory (RAM). Input processor 32 is operable to identify the receipt of a first message and gather messages for batch writing to message cell pool 34. After the predetermined time of the protocol lag has expired for the first message, the message is acknowledged and all of the messages received during the lag are transferred in a batch to individual cells 117 in the message cell pool 34. In one implementation, messages 112 are marked prior to being written to the message cell pool 34 (e.g., in one implementation, messages headers are marked) so as to be able to identify returned messages. Message handling by input processor 32 is described in greater detail below in association with FIG. 2.

The message cell pool 34 is allocated in a storage system of a computer readable medium, which in one implementation is a hard disk. The message cell pool 34 comprises cells 117 of a specific predetermined size or number of bytes. The size of the cells 117 can be selected in relation to the size of the anticipated messages, where the size can be sufficient to store the average sized message in a single cell. In one implementation, the cells 117 are sized to allow each message 120 to be stored in a single cell. In one implementation, cells are sized such that at least substantially 80% of the received messages fit into a single cell. The messaging environment can determine the pool size, such that the capacity of the message cell pool 34 typically can be capable of handling the anticipated volume of messages. Messages 120 larger than the capacity of a single cell can spill over into the next cell. Each cell 117 can be filled in accordance with their respective position in the message cell pool 34 in a numerical order.

The table map 36 can comprise a number of entries, where each entry is a row comprising a number of datum, each datum in an individual column. Each entry has data, such as the location 124 of a cell 117 in relation to a message 120, the size 126 of the message 120, whether the cell 117 contains the end of the message 130, whether the message 120 has been processed, e.g. transmitted, what the status of the message is and other message-related information. The table map 36 can have additional data, such as a time stamp. The table map 36 can be on the same data storage entity (as the message cell pool 34) or a different entity that is connected to the same or a different data processor. The table map can be referred to when randomly accessing messages from storage, as described further below.

The messages 120 that are stored in the message cell pool 34 are then processed, such as by delivering the messages. An asynchronous delivery mechanism can be employed. Other actions that can be performed in the processing are virus scanning, spam detection, pornography detection, etc. In one implementation, input processor 32 processes the messages for delivery. Alternatively, a separate delivery processor 40 can be provided. Input processor 32 and delivery processor 40 can be a same processor. For purposes of simplicity of the description, the delivery processing will be described in an implementation that includes a delivery processor. Other implementations are possible.

In one implementation, delivery processor 40 operates to process each message individually in the order written into the message cell pool 34, reading each message from the cells 117 based on the table map 36 information and attempting to transmit the message to the designated receiver. A delivery attempt may include opening a TCP/IP connection and exchanging protocols. After a successful delivery, the successful delivery can be recorded in the table map 36.

In one implementation, delivery processor 40 uses a pool of threads. Each thread simultaneously opens a number of TCP/IP connections for operations such as the DNS lookup or protocol exchange or data transmission, and manages the state of message processing for all the connections. In case of a delay in the remote system, such as DNS service taking a long time to resolve an IP address from a domain name, or when the remote server is busy handling other requests and is irresponsive, or the remote server is temporarily down, the thread will set a message aside by recording the current state of message processing in a memory, such as memory 50, and utilize the same thread to handle another message using another connection. Delivery processor 40 can use a callback mechanism to notify the thread when the set aside message is ready for further action. In one implementation, the callback mechanism originates from an underlying computer network layer I/O device driver. In one implementation, a thread can complete a transmission in progress prior to taking up the set aside message for further processing. When multiple connections with messages are ready at a same time, the thread can be configured to take on each message one by one. In the event that the remote system disconnects a set aside message, because the processor is busy handling other messages, that set aside message can be characterized as a failed transmission and moved to a backup storage (not shown). Set aside messages can be stored, such as in processor memory 50.

When a message is returned from the remote server due to a system error, such as a wrong address or an out of quota or simply the remote system is down, the message can be saved in the message cell pool 34 just as other newly received messages. When the delivery processor 40 tries to deliver the returned message, the delivery processor 40 can recognize the message as returned by analyzing the message header or any other identifiable feature that indicates the message was sent out from the message processing system 10. The delivery processor 40 can store returned messages in a file-based or backup system and remove the message from the message cell pool 34. Periodically the system can process returned messages until either they are successfully handled or have reached a maximum number of attempts for processing and are discarded. Delivery processing is described in greater detail below in association with FIG. 3.

Figure 2:
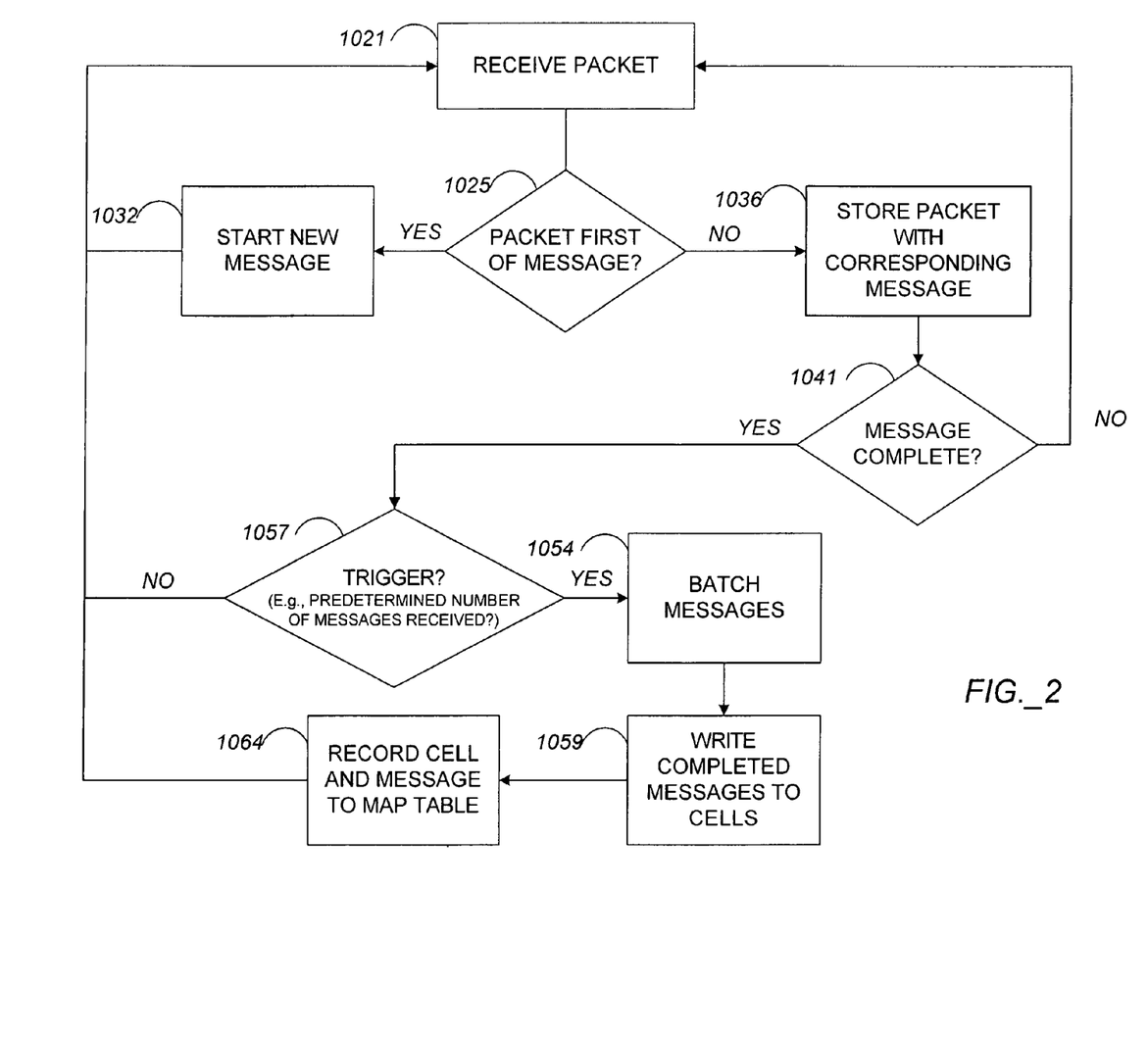
FIG. 2 is a flow diagram of message receipt and storage.

A message processing system including the components described above can be use to receive a message, as described below and in FIG. 2. Clients transmit messages to the system. Each message includes data, the address of the sender and the recipient(s) and can optionally include a traversing path, such as IP address. Typically the messages are broken up into multiple packets for transmitting. Referring now to FIGS. 1 and 2, a packet is received by the system 1021, such as the data processing in unit 20 of an MMSC. The data processing unit 20 determines whether the packet is the first of a group of packets, i.e., a message, or whether the packet belongs to a group of packets that the system has already begun to receive 1025. If the memory does not already contain packets from a corresponding message (the "yes" branch), a new message is designated. If the received packet belongs with packets of a corresponding message (the "no" branch), the packet is stored i.e., in storage memory 30, with the rest of the received packets from the corresponding message 1036. The packets for each message have a sequence in which they can be ordered.

The data processing unit 20 determines whether the message to which the packet was added is complete 1041. If the message is not complete (the "no" branch), the data processing unit awaits a new packet 1021. If the message is complete (the "yes" branch), the data processing unit determines whether a trigger event has occurred 1057. In one implementation, the trigger event can be the receipt of a predetermined number of messages. Other trigger events are discussed below. If the predetermined number of completed messages have not been received (the "no" branch), the processor continues to received packets 1021. If the predetermined number of complete messages have been received (the "yes" branch), i.e., the capture period has elapsed, the completed messages are batched 1054. The batched messages are written to a persistent storage (i.e. message cell pool 34) 1059. In one implementation, portions of a message can be written as part of a batch, that is, input processor 32 can be configured to include in a batch a portion of message that has been received such that the portion can be written to message cell pool 34 prior to receipt of the entire message. In one implementation, when a write to cell function occurs, all portions of messages and complete messages are written to cells (i.e., input processor 32 does not wait for complete messages to be received before writing to the message cell pool 34).

Each message is either written into a single cell or more than one cell when the message is greater than the capacity of the cell. When a message is written to the cell, the location of the cell is recorded as an entry in the table map 1064 along with any other relevant information, such as size, and whether the message is complete in a cell or subsequent cell. This process is repeated with each successive write to the cells. In one implementation, message processing system 10 does not treat each individual message as a separate file. Rather, groups of cells 117 or all of the cells 117 in the cell message pool 34 are processed as one file. Treating groups of cells as files or the entire cell structure as a single file can reduce disk fragmentation.

In one implementation, the trigger event described in step 1057 is the expiration of the protocol lag time. More specifically, the initial message received in a capture period defines the beginning of the capture period. The end of the capture period (i.e., the expiration of the protocol lag time) triggers the end of the capture period. Messages received during the capture period can then be batched and written to the message cell pool 34. In one implementation, the trigger is a time period that is determined by the protocol lag. In such an implementation, input processor 32 may immediately send acknowledgement signals or alternatively may send acknowledgment signals coincident with the batching process (i.e., the acknowledgement signals may not be sent immediately after receipt of a given message and instead delayed so as to allow for the efficient batching of messages in the storage memory 30). Messages arriving within the capture period form a batch of messages written to the message cell pool 34. The SMTP or SMPP protocol permits a predetermined lag before acknowledgement which time lag can be as long as 10 minutes. During this time lag, the input processor 32 can wait for additional messages from any client prior to batch writing messages to message cell pool 34.

In one implementation, the trigger event described in step 1057 can be defined in other ways including by the expiration of a system predefined time, such as $\frac{1}{10}$ of a second or another time adequate for the system traffic and storage capacity of the memory. However, other ways of determining when to trigger the batch write operation can be selected.

A message can have information added to the message, such as a header to notify the system of the processing history of the message. Such additional information can include the identity of the system. The additional information permits recognition that the message has been processed by the system in the event the message is returned to the system. In the case of email, the system may indicate in the header that the system has received the message.

As the number of received messages increases, cells are filled in the order in which the messages are received until the message cell pool 34 is filled. In one implementation, when the message cell pool 34 is filled, no new messages can be written to the message cell pool 34. As a practical matter, the message cell pool 34 is usually available for new messages, without requiring the memory to store messages while waiting for the message cell pool 34 to become available. However, in the event that the availability of the message cell pool 34 is more limited than the system requires, one or more additional message cell pools can be provided. When all messages have been processed, as evidenced by the table map, as either having been successfully transmitted or having been sent to a backup database, new messages can be entered overwriting messages in cells from the beginning of the cell bank. In one implementation, not all of the messages in the message cell pool 34 are required to be processed prior to the overwriting of older messages. That is, in one implementation, pointers to the head and the tail of the message cell pool 34 can be used to read and write messages from the message cell pool 34 (i.e., so that new messages can be written to appropriate locations of the message cell pool 34 and so that the oldest messages in the message cell pool 34 can be processed for delivery).

Messages received from a client may be subject to various interruptions, e.g., there may be stoppages of transmission from the client. The system can disconnect from a remote system after a configurable predetermined period of time. If the handshake is unsuccessful or the message is in an unrecognizable form, the system can disconnect. When only a partial message is received, the partial message can be discarded.

Figure 3:
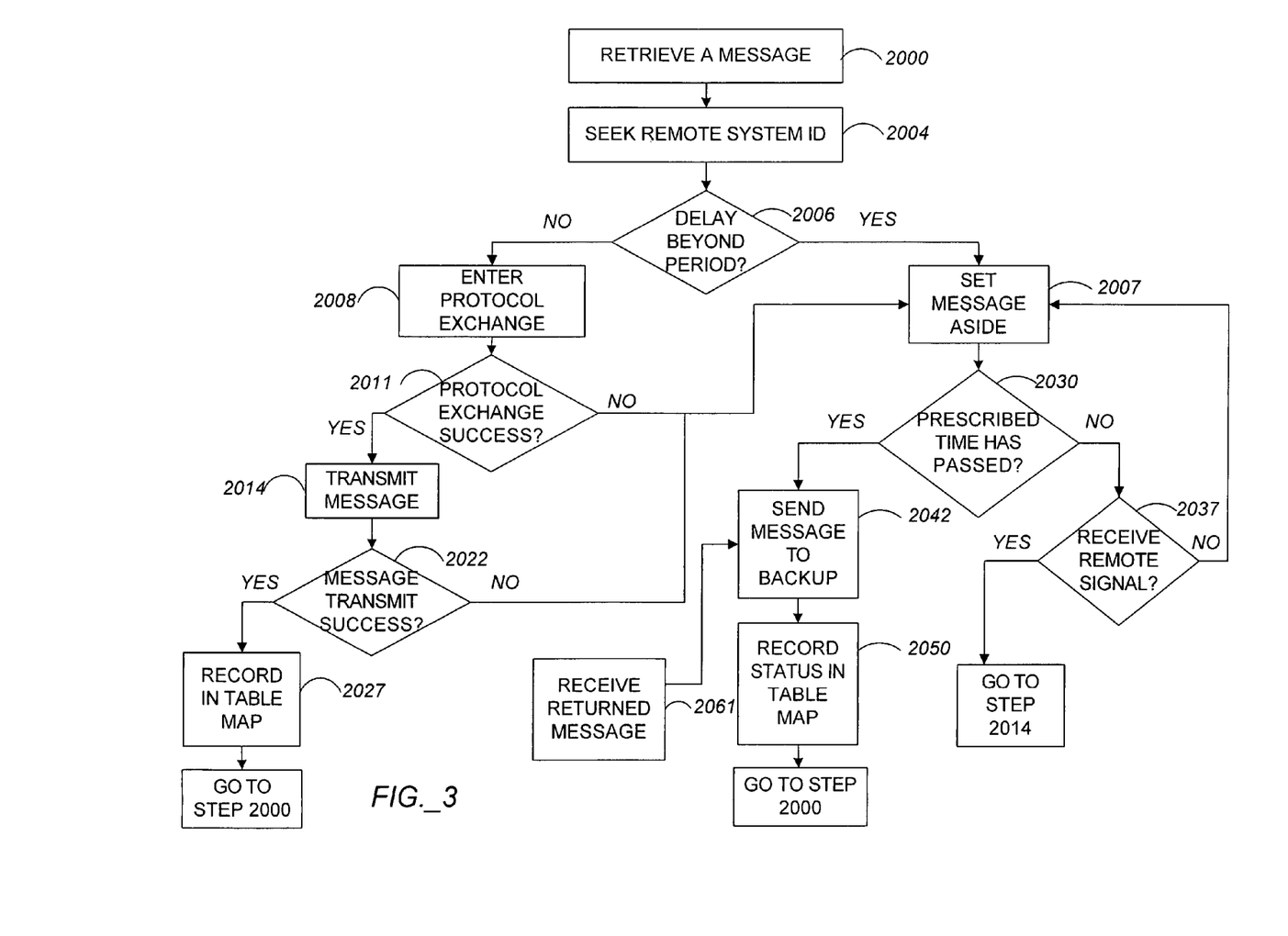
FIG. 3 is a flow diagram of message processing for delivery.

FIG. 3 shows a flow diagram for operation of the delivery processor 40 when delivering a message to a recipient. Referring now to FIGS. 1 and 3, the delivery processor 40 begins by retrieving one or more messages from the message cell pool 34. In one implementation, the delivery processor 40 removes one message at a time from the message cell pool 34. In another implementation, the delivery processor 40 retrieves a block of messages from the message cell pool 34 prior to processing.

Delivery processor 40 seeks a remote receiver identity 2000, where normally there will be a delay. Delivery processor 40 determines whether the delay is beyond a predetermined period 2003. If the delay is beyond the predetermined period, (the "yes" branch), the message is set aside 2004 and another message is processed 2000. If there is no delay or the delay is not beyond the predetermined period, (the "no" branch), the message enters into protocol exchange 2008 with the recipient. Delivery processor 40 determines whether the protocol exchange was successful 2011. If for any reason the protocol. exchange is not successful (the "no" branch), the message is then set aside 2004. After a successful protocol exchange (the "yes" branch), the message is transmitted to the remote receiver 2014. If the message is successfully transmitted (the "yes" branch), the successful transmission is recorded in the table map 2027. If for any reason there is an interruption or a failure in transmitting the message (the "no" branch), the message is set aside 2004.

The messages set aside 2004 are retained until the messages are ready for transmission to the remote receiver. Delivery processor 40 can track the amount of time that a message has been set aside 2030. If a prescribed amount of time has passed and no signal or response has been received from the remote receiver (the "yes" branch), the message is sent to backup 2042. When a message is sent to backup, the status of the message as processed is recorded in a table map 2050. At any time the remote receiver can call back or send a signal to the delivery processor 40 indicating that it is ready to receive the message and the system can receive the sent signal 2037. When the delivery processor 40 receives the signal indicating that the remote receiver is ready to receive the message and the system receives this signal (the "yes" branch), the message can be processed and is transmitted 2014. Otherwise, the system continues to wait for the signal or the prescribed time to pass (the "no" branch).

When a message is returned to the system 2061, such returned message can be stored in the backup database 2042. Messages in the backup storage are subject to being overwritten in the message cell pool 34. The delivery processor 40 can periodically check whether there are messages that need to be delivered in the backup storage and transfer the messages to the system for transmission. The number of attempts to transmit a message can be recorded by the delivery processor 40. When the maximum number of attempts defined by the system has been reached, the message can be erased.

The delivery processor 40 can deliver the messages in the order that the messages were received by the message processing system 10. Alternatively, the delivery processor 40 can delivery the messages out of the order in which the messages were received, as described further below.

In one implementation, the delivery processor 40 retrieves messages and writes the retrieved messages into one of multiple output queues 38. The delivery processor 40 can be configured to write messages to one of the output queues 38 based on information in the message, such as a domain name or priority indication on the message. The delivery processor 40 can then process the messages from the one or more output queues 38, where each queue can have a priority associated with it. For example, messages of high priority can be written to a first queue, messages of a standard priority can be written to a second queue and messages of a low priority can be written to a third queue. The delivery processor 40 can access the first queue 50% of the time for delivering messages, access the second queue 35% of the time for delivering messages and access the third queue 15% of the time. Other priority systems, such as different allocations (i.e., quality of service (QOS)) of accessing the various queues can be configured. In another implementation, the delivery processor 40 can randomly access the output queues 38. In yet another implementation, QOS can be provided by assigning one queue to messages that have not yet been sent out of the system. The other queues can be reserved for messages that have been returned to the system or that have not been delivered due to a transmission failure. The queue for messages that have not yet been sent out of the system can be prioritized over the other queues.

The subject system can be readily applied to a wide variety of applications. The methods described above can be applied to wireless messaging, such as SMS systems, email systems, stock or commodity exchange systems, and the like. In addition to messaging, the system can be applied to any persistent store and forward application. In place of storing and processing messages, files can be stored and processed. Each file can be parsed into packets for transfer.

All references referred to in the text are incorporated herein by reference as if fully set forth herein. The relevant portions associated with this document will be evident to those of skill in the art. Any discrepancies between this application and such reference will be solved in favor of the view set forth in this application.

Although the invention has been described with reference to the above examples, it will be understood that modifications and variations are encompassed within the spirit and scope of the invention. Accordingly, the invention is limited only by the following claims.

What is claimed is:
1. A method for processing messages, comprising:
 receiving a plurality of messages into a message processing system, wherein the plurality of messages includes a first message;
 determining a protocol lag time period, wherein the protocol lag time period defines the time period in which an acknowledgement signal is returned to a sender of the first message;
 storing the received messages in first memory locations of the message processing system during the protocol lag time period;
 determining the protocol lag time period has expired;
 selecting from the first memory locations, in response to the expiration of the protocol lag time period, stored complete received messages;
 batch writing a plurality of the selected messages from the first memory locations to one or more message cells in second memory locations of the message processing system;
 recording into a table map, stored in third memory locations of the message processing system, an association between each message and each cell in which the message is written; and
 asynchronously transmitting messages from the one or more message cells via a delivery processor, and wherein failure to complete storing of one or more of the received messages in the first memory locations does not prevent completion of batch writing of the others of the plurality of messages to the one or more message cells.

2. The method of claim 1, wherein receiving includes acknowledging receipt of the each of the plurality of messages when received.

3. The method of claim 1, wherein batch writing the one or more messages to cells includes batch writing upon receipt of a trigger.

4. The method of claim 3, wherein receiving a trigger includes determining that a predetermined amount of time has passed.

5. The method of claim 4, wherein determining that a predetermined amount of time has passed includes determining the predetermined amount of time has passed since a previous batch write operation.

6. The method of claim 3, wherein receiving a trigger includes determining that a protocol time lag has expired for a first message received in the plurality of messages.

7. The method of claim 6, wherein receiving a trigger includes determining that a predetermined time period has expired.

8. The method of claim 3, wherein:
receiving a trigger occurs before receiving an entire message such that a portion of one message is received; and
batch writing the one or more messages to cells includes writing the portion of the one message such that the portion is written to the cells prior to receiving the entire message.

9. The method of claim 1, wherein:
batch writing a plurality of the selected messages from the first memory location to one or more message cells includes writing a group of cells as a file and not writing each message as a separate file.

10. The method of claim 1, wherein:
receiving a plurality of messages includes receiving the one or more messages in an order of receipt; and
asynchronously delivering the one or more messages includes delivering the one or more messages in the order of receipt.

11. The method of claim 1, wherein
receiving the plurality of messages includes receiving the one or more messages in an order of receipt, and
wherein asynchronously delivering the one or more messages includes delivering the plurality of messages in an order different from the order of receipt.

12. The method of claim 1, further comprising processing the messages in the cells for delivery including writing the one or more messages to one or more queues.

13. The method of claim 12, wherein a priority is assigned to each of the one or more queues and the method further comprises:
determining a priority for each of the one or more messages; and
writing the one or more messages to the one or more queues according to the priority for each of the one or more messages and the priority assigned to each queue.

14. The method of claim 13, wherein determining a priority for each of the one or more messages includes determining an attribute of the recipient.

15. The method of claim 13, wherein determining a priority for each of the one or more messages includes determining whether for each of the one or more messages has been a previous delivery attempt.

16. The method of claim 13, further comprising retrieving a block of messages from the cells for asynchronous delivery, wherein the block of messages includes two or more messages.

17. The method of claim 1, wherein batch writing the plurality of the selected messages to cells includes writing to cells of a predetermined size.

18. The method of claim 1, further comprising mapping each of the plurality of messages such that a location of each message in the one or more cells is recorded in a table map.

19. The method of claim 18 wherein mapping each message includes recording in the table map a size of the message.

20. The method of claim 18 wherein mapping each message includes recording in the table map whether the cell contains an entire message.

21. The method of claim 18 wherein mapping each message includes recording in the table map information about processing of the message.

22. The method of claim 1, further comprising:
receiving a second message as returned from the recipient;
determining that the second message is a returned message; and
storing the returned message in a backup system for processing at a later time.

23. A computer implemented system for processing messages, comprising:
a message processor for receiving a plurality of messages including a first message, and for storing said messages into a first memory location, acknowledging received messages and then batching received messages, and for determining a protocol lag time period, wherein the protocol lag time period defines the time period in which an acknowledgement signal is returned to a sender of the first message;
a second memory location having one or more cells of a predetermined size, the message processor operable to write the messages in batches to the second memory location in response to expiration of the protocol lag time period, including storing respective individual messages to the one or more cells depending on a size of a given message; and
a table map stored in a third memory location for recording an association between each message that is stored in the second memory location and each cell in which the message is written,
wherein the message processor is further configured such that failure to complete storing of one or more of the messages to the first location does not prevent completion of batch writing of the others of the plurality of messages to the one or more cells.

24. The system of claim 23, wherein
the one or more cells have a numeric order, and
wherein the one or more cells are written to in the numeric order of the cells.

25. The system of claim 23, wherein the one or more cells are each a predetermined size and the size is substantially equal to a size of a majority of messages processed.

26. The system of claim 23, wherein the one or more cells are sized to store at least 80% of an average message size for messages received by the message receiver.

27. The system of claim 23, further comprising a delivery processor for delivering the messages to a receiver.

28. The system of claim 27, further comprising a queue structure of receiving storing messages to be delivered by the delivery processor and extracted from the cells.

29. The system of claim 28, wherein
the queue structure includes one or more queues and each queue has a priority, and
wherein the delivery processor is configured to access each queue according to the priority of the queue.

30. The system of claim 23, further comprising a backup data storage for storing files that have not been processed successfully, wherein the delivery processor processes the files that have not been processed successfully.

31. The method of claim 1, wherein writing of a second of a plurality of messages may be initiated before completion of the writing of a first message of the plurality of messages.

32. The system of claim 23, wherein the message processor is further configured such that writing of a second of a plurality of messages may be initiated before completion of the writing of a first message of the plurality of messages.

33. The method of claim 1, wherein the one or more messages may be of any of a plurality of media types.

34. The system of claim 23, wherein the one or more messages may be of any of a plurality of media types.

35. A system for processing messages, comprising:
means for receiving a plurality of messages including a first message;
means for determining a protocol lag time period, wherein the protocol lag time period defines the time period in which an acknowledgement signal is returned to a sender of the first message;
means for storing the received messages in a first memory location during the protocol lag time period;
means for selecting, in response to the expiration of the protocol lag time period, received messages that are stored;
means for batch writing a plurality of the selected messages from the first memory locations to one or more message cells in a second memory location;
means for recording, in a third memory location, an association between each message and each cell in which the message is written; and
means for asynchronously transmitting messages from the one or more message cells,
wherein failure of the storing means to store of one or more of the received messages to the first memory location does not prevent the completion of the batch writing means to write the others of the plurality of messages to the one or more message cells.

36. A method for processing messages, comprising:
receiving a plurality of network packets into a message processing system, wherein at least a portion of the network packets are associated with one or more messages, the one or more messages including a first message;
determining a protocol lag time period, wherein the protocol lag time period defines the time period in which an acknowledgement signal is returned to a sender of the first message;
grouping the at least a portion of the network packets into the one or more messages according to the message they are associated with;
determining a completion status of the one or more messages;
storing the one or more messages in first memory locations of the message processing system during the protocol lag time period;
in response to the expiration of the protocol lag time period, selecting from the first memory locations, at least a portion of the one or more messages based, at least in part, on their completion status;
batch writing a plurality of the selected messages from the first memory locations to one or more message cells in second memory locations of the message processing system;
recording into a table map, stored in third memory locations of the message processing system, an association between each message and each cell in which the message is written; and
asynchronously transmitting messages from the one or more message cells via a delivery processor,
wherein failure to complete storing of one or more of the received messages in the first memory locations does not prevent completion of batch writing of the others of the plurality of messages to the one or more message cells.

37. The method of claim 36, wherein the messages are selected if their completion status indicates the message is complete.

38. The method of claim 36, further comprising sending acknowledgements for the portion of the network packets associated with messages at the end of the protocol lag.

39. The method of claim 36, wherein the network packets and the protocol lag are associated with the same protocol.

* * * * *